United States Patent [19]

Fette

[11] 4,369,500
[45] Jan. 18, 1983

[54] HIGH SPEED NXM BIT DIGITAL, REPEATED ADDITION TYPE MULTIPLYING CIRCUIT

[75] Inventor: Bruce Fette, Mesa, Ariz.

[73] Assignee: Motorola Inc., Schaumburg, Ill.

[21] Appl. No.: 198,688

[22] Filed: Oct. 20, 1980

[51] Int. Cl.³ .......................... G06F 7/50; G06F 7/52
[52] U.S. Cl. .................................... 364/758; 364/786
[58] Field of Search ............... 364/758, 757, 759, 760, 364/786, 787, 788

[56] References Cited

U.S. PATENT DOCUMENTS

| | | | |
|---|---|---|---|
| 3,670,956 | 6/1972 | Calhoun | 364/758 |
| 3,691,359 | 9/1972 | Dell et al. | 364/758 |
| 3,743,824 | 7/1973 | Smith | 364/788 |
| 3,752,971 | 8/1973 | Calhoun et al. | 364/758 |
| 3,767,906 | 10/1973 | Pryor | 364/786 |
| 3,900,724 | 8/1975 | McIvev et al. | 364/758 |
| 3,932,734 | 1/1976 | Parsons | 364/786 |
| 4,031,379 | 6/1977 | Schwartz | 364/786 |
| 4,052,604 | 10/1977 | Maitland et al. | 364/786 |
| 4,152,775 | 5/1979 | Schwartz | 364/786 |

OTHER PUBLICATIONS

Chu, *Digital Computer Design Fundamentals*, McGraw-Hill, 1962, pp. 26–29.

*Primary Examiner*—David H. Malzahn
*Attorney, Agent, or Firm*—Eugene A. Parsons

[57] ABSTRACT

N (M+1) combining circuits mathematically arranged into M addition rows and a final carry resolution row so as to form N+M−1 columns, each column having an output, an N-bit multiplicand and an M-bit multiplier being connected to the combining circuits to provide digital, repeated addition type multiplication of the numbers represented by the N and M bits. The combining circuits in the final carry resolution row each have a carry bit input connected to the carry bit output of the previous combining circuit and an inverting amplifier is included in the carry propagation line every three or four combining circuits, to regenerate the carry bit. Further the entire multiplying circuit is formed on a single semiconductor chip and includes N inputs pads and N output pads with input latches and output latches for operating on both the N input bits and the M input bits with very little loss in time.

13 Claims, 10 Drawing Figures

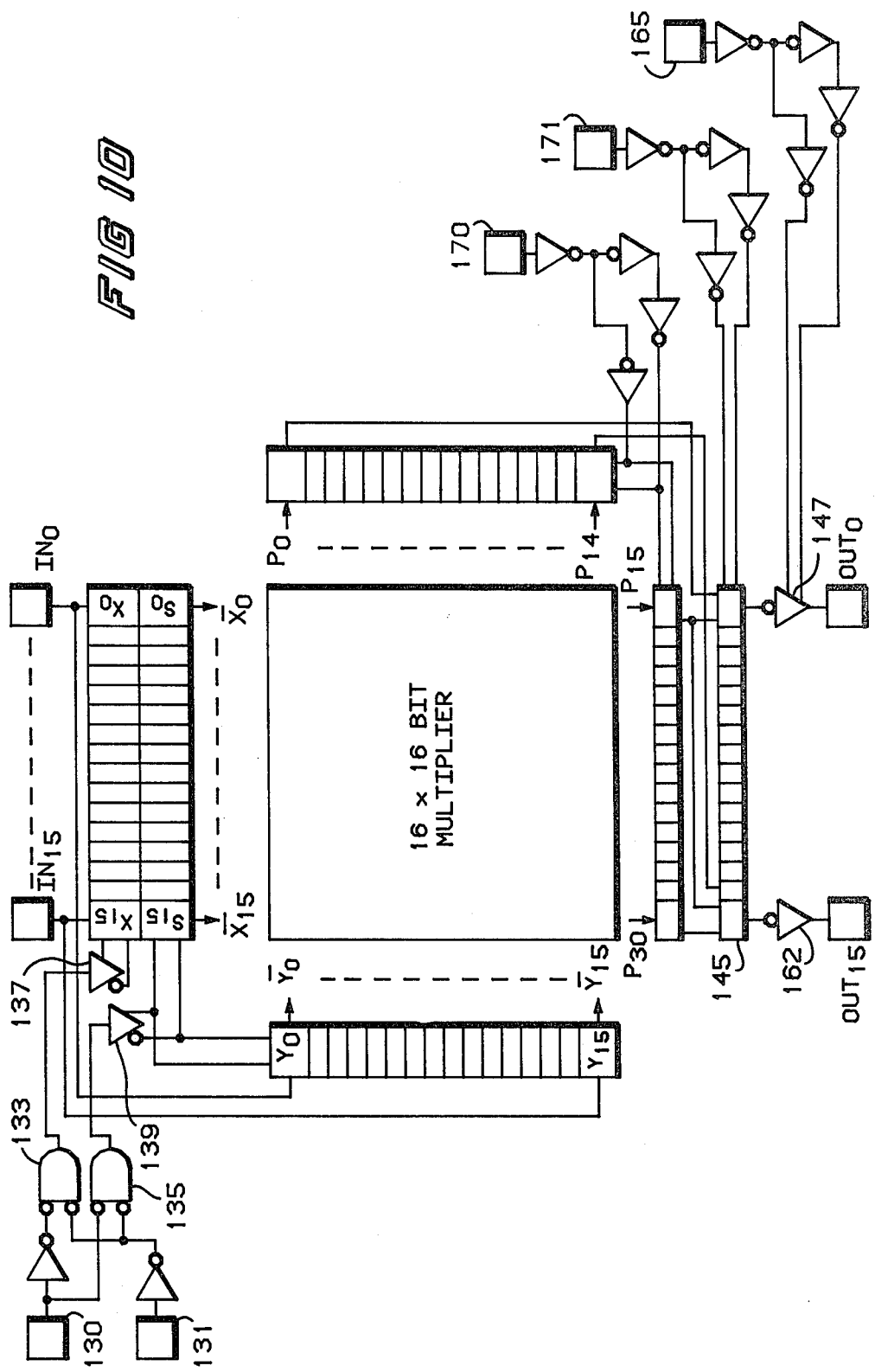

HIGH SPEED NXM BIT DIGITAL, REPEATED ADDITION TYPE MULTIPLYING CIRCUIT

BACKGROUND OF THE INVENTION

In digital, or binary, multiplication there are three general approaches including: repeated addition, multiple-digit multiplication, and simultaneous multiplication. Generally, the repeated addition approach is the simplest and, while there are a variety of repeated addition methods, to increase the speed of the device it is desirable to minimize the longest propagation path as well as the total number of partial products which must be added. Several of the repeated addition methods, when implemented in combinational hardware, require sign bit extension of low order partial products and, thus, the logic becomes unwieldly. The repeated addition approach commonly referred to as the Burks-Goldstine-VonNeumann method, is implemented herein because it does not require sign bit extension and thereby minimizes hardware.

SUMMARY OF THE INVENTION

The present invention pertains to a high speed $N \times M$ bit digital, repeated addition type multiplying circuit including a plurality of rows and columns of multiply/adder cells interconnected to provide repeated addition multiplication with the carry-bit output of each of said cells connected to the carry-bit input of the corresponding cell in the next highest row. Generally, the multiplying circuit has M rows with N cells in a row and a final carry resolution row having N cells therein with the carry-bit from each previous cell in the resolution row and the carry-bit from the previous cell in the M row being applied thereto for adding to a sum bit from the corresponding cell in the M row. This provides a fast carry propagation time with a layout approach convenient to LSI integration.

In order to provide a fast CMOS multiplier featuring small multiply times, small pin counts, low power, and easy application to many problems, several design approaches are combined, including: multiplexed-pipelined input bus and register, multiplexed-pipelined output bus and registers, fast carry circuit topology, and balanced propagation between sum and carry paths so that the total propagation delay is minimized within the constraints of CMOS technology.

It is an object of the present invention to provide a new and improved high speed $N \times M$ bit digital, repeated addition type multiplying circuit.

It is a further object of the present invention to provide a high speed addition type arithmetic logic unit including a new and improved high speed carry propagation line.

It is a further object of the present invention to provide a high speed $N \times M$ bit digital, repeated addition type multiplying circuit including multiplexed-pipelined input and output with balanced propagation between sum and carry paths and formed on a single semiconductor chip.

It is a further object of the present invention to provide a high speed $N \times M$ bit digital, repeated addition type multiplying circuit incorporating the Burks-Goldstine-VonNewmann method of repeated addition and formed on a single semiconductor chip.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures:

FIG. 10 is a block diagram of another portion of the sixteen-by-sixteen bit multiplying circuit illustrated partially in FIG. 2.

DESCRIPTION OF THE PREFERRED EMBODIMENTS

The present invention pertains to a high speed digital, repeated addition type multiplying circuit for multiplying a number represented by N bits times a number represented by M bits of digital information. One of the numbers is the multiplier and the other number is the multiplicand, in accordance with normal mathematical nomenclature. In general, both numbers will be represented by the same number of bits but the letters N and M are utilized herein to indicate that a different number of bits can be utilized if desired. Further, in the following descriptions of the invention it is assumed that the number of leads supplied to a multiplying circuit are the same as the number of leads at the output thereof. However, it will be obvious to those skilled in the art that different numbers of leads might be utilized without materially affecting the invention. Further, it will be obvious to those skilled in the art that the number of bits representing the multiplier and the multiplicand can be reversed and/or varied from the following descriptions without materially affecting the invention.

Figure 1:
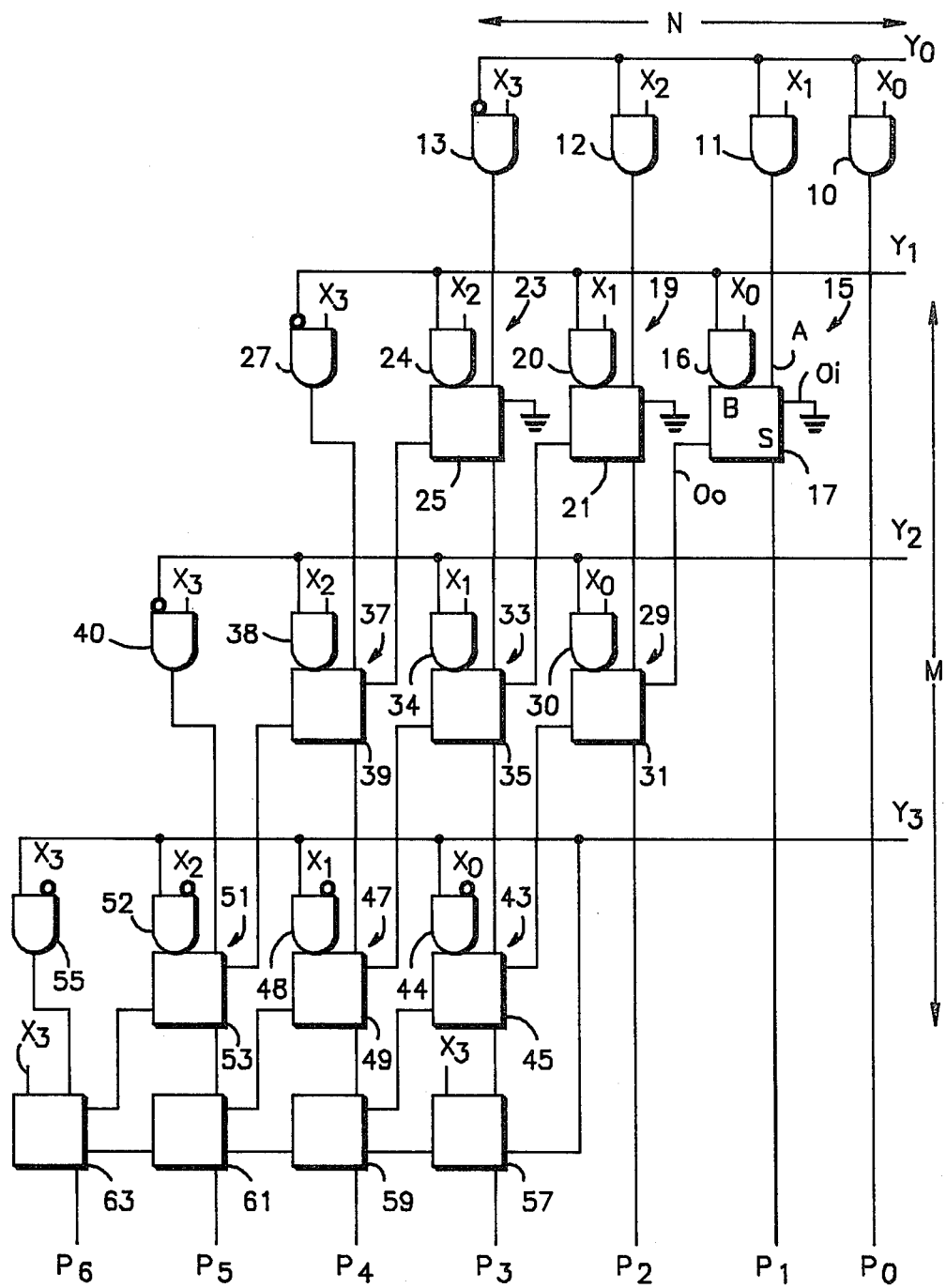
FIG. 1 is a block diagram of a four-by-four bit digital, repeat addition type multiplying circuit embodying the present invention.

Referring specifically to FIG. 1, a high seed $N \times M$ bit digital, repeated addition type multiplying circuit is illustrated wherein the multiplier, Y, is represented by four bits and the multiplicand, X, is represented by four bits. In this embodiment the four bits of the multiplier are $Y_0$ through $Y_3$ with $Y_3$ being the sign bit. The multiplicand is represented by $X_0$ through $X_3$ with $X_3$ being the sign bit.

$N(M+1)$, or twenty, combining circuits are utilized to form the multiplying circuit. The combining circuits are mathematically arranged with N, or four, combining circuits per row and M addition rows with one additional final carry resolution row. For ease in following the operation of the multiplying circuit, the combining circuits in the various rows are staggered similar to the way a multiplication problem would be positioned in hand, or human, calculations. Thus, the multiplying circuit provides $N+M-1$ outputs, or seven, which are designated $P_0$ through $p_6$ in FIG. 1.

The first row of the M addition rows includes four combining circuit which are simply four AND gates 10, 11, 12 and 13. Each of the AND gates 10 through 13 has two inputs and a single sum output. The first gate 10 receives bits $Y_0$ and $X_0$ and the output is connected to the output terminal $P_0$. Second gate 11 receives bits $X_1$ and $Y_0$, third gate 12 receives bits $X_2$ and $Y_0$, and fourth gate 13 receives bits $X_3$ and an inverted $Y_0$. In the second row, a first combining circuit 15 includes an AND gate 16 connected to receive bits $X_0$ and $Y_1$ and a multiplying/adder cell 17 connected to receive the output of the AND gate 16 and the sum output of the AND gate 11 from the first row. Further, the cell 17 has a carry input connected to a reference potential, in this embodiment ground, and a carry output. The sum output of the cell 17 is connected directly to the $P_1$ output terminal. A second combining circuit 19 in the second row includes an AND gate 20 connected to receive bits $X_1$ and $Y_1$ and a multiply/adder cell 21 connected to receive outputs from AND gates 20 and 12 and including a carry input connected to ground. Cell 21 also supplies a carry output and a sum output. A third combining circuit 23 in the second row includes an AND gate 24 connected to receive bits $X_2$ and $Y_1$ and a multiply/adder cell 25 connected to receive the sum outputs from AND gate 24 and AND gate 13 along with a carry input, which is connected to ground. The cell 25 also supplies a carry output and a sum output. The fourth and final combining circuit in row 2 is simply an AND gate 27 having two inputs connected to receive the bits $X_3$ and an inverted $Y_1$.

A first combining circuit 29 in the third row includes an AND gate 30 connected to receive bits $X_0$ and $Y_2$ and a multiply/adder cell 31 connected to receive the sum outputs of the AND gate 30 and the cell 21 from row 2. The cell 31 also has a carry input connected to the carry output of cell 17 in row 2. Cell 31 includes a carry output and a sum output which is connected directly to the output terminal $P_2$ of the multiplying circuit. A second combining circuit 33 in the third row includes an AND gate 34 connected to receive bits $X_1$ and $Y_2$ and a multiply/adder cell 35 connected to receive the sum output from the AND gate 34 and the sum output from the cell 25 in row 2. Also, the cell 35 has a carry input which is connected to the carry output of the cell 21 in row 2. The cell 35 has a carry output and a sum output. A third combining circuit 37 in the third row includes an AND gate 38 connected to receive bits $X_2$ and $Y_2$ and a multiply/adder 39 connected to receive the sum outputs of the AND gates 38 and 27, as well as the carry output from the cell 25 in row 2. The cell 39 also has a carry output and a sum output. A fourth combining circuit in the row 3 is simply an AND gate 40 connected to receive bits $X_3$ and an inverted $Y_2$.

A first combining circuit 43 in the fourth row includes an AND gate 44 connected to receive bits $Y_3$ and an inverted $X_0$ and a multiply/adder cell 45 connected to receive the sum output of the AND gate 44, the sum output of the cell 35 in row 3 and the carry output of the cell 31 in row 3. The cell 45 also supplies a carry output and a sum output. A second combining means 47 in row 4 includes an AND gate 48 connected to receive bits $Y_3$ and an inverted $X_1$ and a multiply/adder cell 49 connected to receive the sum output of the AND gate 48, the sum output of the cell 39 in row 3, and the carry output of the cell 35 in row 3. The cell 49 also supplies a carry output and a sum output. A third combining circuit 51 in the fourth row includes an AND gate 52 connected to receive bits $Y_3$ and an inverted $X_2$ and a multiply/adder cell 53 connected to receive the sum outputs of the AND gates 52 and 40 and the carry output of cell 39 in row 3. The cell 53 also supplies a carry output and a sum output. A fourth combining circuit in row 4 simply includes an AND gate 55 connected to receive bits $Y_3$ and an inverted $X_3$.

A first combining circuit in the final carry resolution row includes a multiply/adder cell 57 connected to receive bits $X_3$ at a first input and the sum output of the cell 45 in row 4 at a second input. A third input of the cell 57 is connected to receive bits $Y_3$. The cell 57 provides a carry output and a sum output which is connected to the output terminal $P_3$ of the multiplying circuit. A second combining circuit of the final carry resolution row includes a multiply/adder cell 59 connected to receive the sum output of the cell 49, the carry output of the cell 45 and the carry output of the cell 57. The cell 59 also provides a carry output and a sum output which is connected to the output terminal $P_4$ of the multiplying circuit. A third combining circuit in the final carry resolution row includes a multiply/adder cell 61 connected to receive the sum output from the cell 53, the carry output from the cell 49 and the carry output from the cell 59. The cell 61 provides a carry output and a sum output which is connected to the output terminal $P_5$ of the multiplying circuit. A fourth and final combining circuit of the final carry resolution row includes a multiply/adder cell 63 having inputs connected to receive bits $X_3$, the sum output of the AND gate 55, the carry output of the cell 53 and the carry output of the cell 61. The cell 63 has a sum output which is connected to the output terminal $P_6$ of the multiplying circuit.

Figure 3:
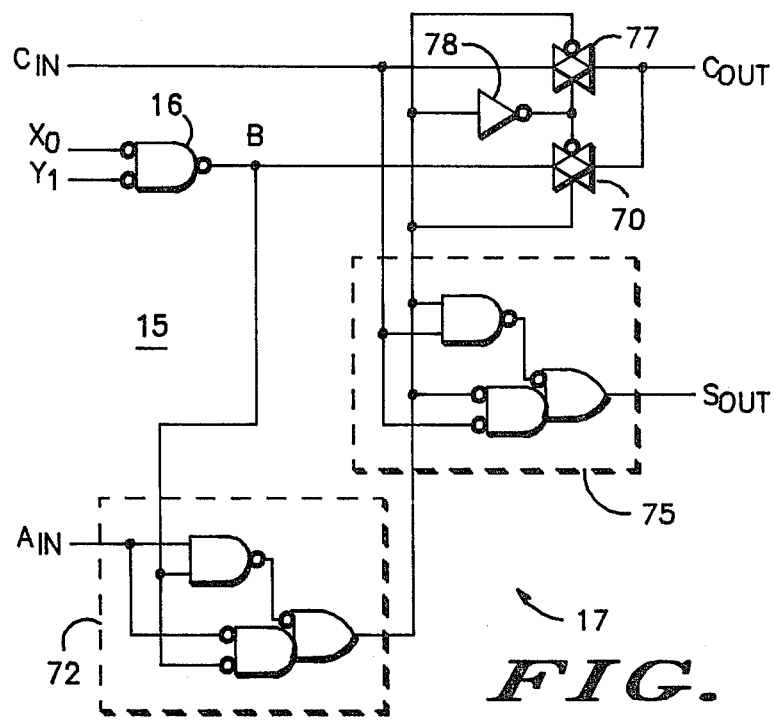
FIGS. 3 and 4 are detailed block diagrams of first and second types of combining circuits, both of which are illustrated generally in FIG. 1.

Each of the multiply/adder cells in the multiplying circuit of FIG. 1 is constructed generally in accordance with the teachings of U.S. Pat. No. 3,843,876, entitled "Electronic Digital Adder Having a High Speed Carry Propagation Line" issued Oct. 22, 1974. Further, the various adder cells are referred to as multiply/adder cells because they are used in a multiplying circuit. All of the combining circuits 15, 19, 23, 29, 33, and 37 are constructed similarly and this construction can be seen more clearly by referring to FIG. 3 wherein a more detailed block diagram of the combining circuit 15 is illustrated. While only six of the adder cells illustrated in FIG. 3 are utilized in the multiplying circuit of FIG. 1, it will be understood by those skilled in the art that more are utilized as N and/or M are increased e.g. if N and M are sixteen, two hundred and ten of the cells illustrated in FIG. 3 will be utilized. The fast carry multiply/adder cells, for a combinational array multiplier circuit, is a crucial element since the organization can dramatically effect both chip size and propagation performance for a single chip multiplying circuit. Minimizing the longest propagation path and the total number of partial products in conjunction with the high speed carry propagation line of the multiply/adder circuits provides the high speed multiplying circuit of the present invention.

Referring to FIG. 3, the AND gate 16 of the combining circuit 15 has a pair of inputs connected to receive $X_0$ and $Y_1$ bits. The output of the AND gate 16, herein designated B, is applied to an input of a transmission gate 70 and an input of an exclusive OR gate, generally designated 72. A second input of the exclusive OR gate 72, herein designated A, is connected to the output of the AND gate 11 (see FIG. 1). An output of the exclusive OR gate 72 is connected to an input of a second exclusive OR gate, generally designated 75, and to a gate control terminal for the transmission, or pass, gate 70 and for a second transmission, or pass, gate 77. The output of the exclusive OR gate 72 is also supplied through an inverter 78 to a second gate control terminal associated with each of the transmission gates 70 and 77. A second input to the exclusive OR gate 75 is connected directly to an input terminal, herein designated $C_{IN}$, which for this particular combining circuit 15 is connected to ground. Input terminal $C_{IN}$ is also connected through the transmission gate 77 to an output terminal, herein designated $C_{OUT}$, which is connected to the $C_{IN}$ terminal of the cell 31. The output of the exclusive OR gate 75 is connected to an output terminal, herein designated $S_{OUT}$, which is connected directly to the output terminal $P_1$ of the multiplying circuit. While specific block diagrams for the combining gates 72 and 75 are illustrated in FIG. 3, it will be apparent to those skilled in the art that other circuits which perform the same functions might be utilized. Further, many other minor modifications might be incorporated, e.g. providing input signals $\overline{X}_N$ and $\overline{Y}_N$ to the input terminals of the AND gate 16 and inverting these inputs prior to application to the AND gate 16, which modifications may be required to standardize parts or render the present circuitry compatible with presently available circuitry.

In the operation of the cell 15 illustrated in FIG. 3, the AND gate 16 provides an output signal which is essentially equal to X times Y, i.e. the output is a "1" only when both of the inputs are a "1" and if either or both of the inputs are a "0" the output is a "0". The output of the AND gate 16 is then essentially added to the signal at the input A by the exclusive OR gate 72. In a similar fashion the exclusive OR gate 75 adds the signal at the $C_{IN}$ terminal to the output of the exclusive OR gate 72 and supplies the sum to the terminal $S_{OUT}$. If the two inputs to the exclusive OR gate 72 are both "1's" a "0" appears at the output thereof, which opens the transmission gate 70 and allows the "1" from the AND gate 16 to be applied to the $C_{OUT}$ terminal. Similarly, if the output of the exclusive OR gate 72 is a "1" and the signal at the $C_{IN}$ terminal is a "1" the transmission gate 77 is opened allowing the "1" at the $C_{IN}$ terminal to pass therethrough to the $C_{OUT}$ terminal. Thus, the combining circuit illustrated in FIG. 3 provides 2's complement addition and the carry propagation line includes only a single transmission gate in accordance with the U.S. Pat. No. '876, described above.

Figure 4:
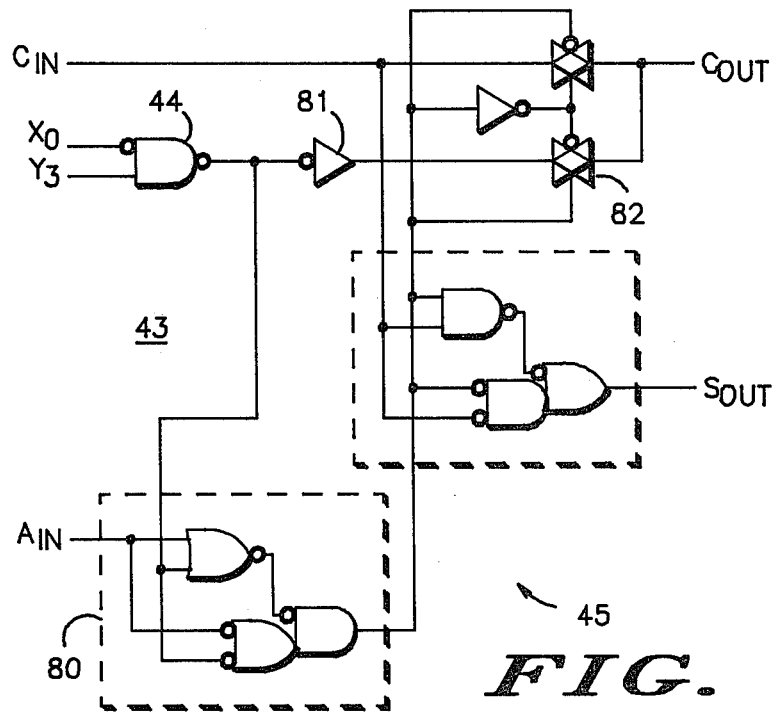

Referring specifically to FIG. 4, a more detailed block diagram for the combining circuits 43, 47, and 51 is illustrated. It will of course be understood by those skilled in the art that if N and M represent larger numbers, such as 16, fifteen of the combining circuits illustrated in FIG. 4 will be utilized. Since the combining circuits 43, 47 and 51 are all identical, only the combining circuit 43 will be described with reference to FIG. 4. Further, the construction and operation of the combining circuit illustrated in FIG. 4 is essentially similar to that described in FIG. 3 except for several modifications and only the modifications will be elaborated upon herein.

The combining circuits of row 4 of FIG. 1 require that the X input to the AND gates 44, 48, 52 and 55 be inverted and, accordingly, FIG. 4 illustrates an inverter at the X input of the AND gate 44. Further, the output of the AND gate 44 is inverted and applied to an exclusive NOR gate 80, rather than the exclusive OR gate 72 illustrated in FIG. 3. The inverted output of the AND gate 44 is also supplied through an inverter and inverter amplifier 81 to a transmission gate 82. The transmission gate 82 operates as the transmission gate 70 in FIG. 3.

The inverting amplifier 81 and the exclusive NOR gate 80 are included in the circuitry to minimize the capacitive load and to increase the speed of the combining circuit 43. Further by connecting the output signal from the AND gate 44 to the exclusive NOR gate 80 prior to the inverter 81, the full drive capability of the inverter 81 is available at the gate 82 and the $C_{OUT}$ terminal.

Referring specifically to FIG. 1 it will be noted that the carry lines of each of the combining circuits in the addition rows (2nd, 3rd, and 4th) are connected from the carry output of one combining circuit, e.g. combining circuit 15, to the carry input of the corresponding combining circuit, e.g. combining circuit 29, in the next highest row. This connection produces a substantial reduction in the length of the carry path and a substantial improvement in multiplier circuit speed over circuits wherein the carry output of each combining circuit is connected to the carry input of the next adjacent combining circuit in the same row. For an N×N bit multiplying circuit, the improved approach requires (N+1) cell propagations (A input to $S_{OUT}$) plus N $C_{IN}$ to $C_{OUT}$ propagations. The approach where the carry output is connected to the carry input of the adjacent combining circuit requires 2N $C_{IN}$ to $C_{OUT}$ propagations and N cell propagations (A input to $S_{OUT}$).

It is desirable in the improved approach for the $C_{IN}$ to $C_{OUT}$ propagations to be faster than the cell propagation (A input to $S_{OUT}$). In the final carry resolution row, all answers from the above columns become valid at approximately the same time but the correct answer must wait on the N carry path propagations. Thus it is highly desirable for the carry path to be extremely fast, as in the cell circuits illustrated in FIGS. 3 through 8. The carry propagation in the combining circuits described (15 in FIG. 3 and 43 in FIG. 4) are the fastest possible circuit requiring no inversion and are capable of approximately 3.3 nanoseconds per stage in 5 micron CMOS technology. Unfortunately, this cascaded pass gate carry propagation path gets slower as the line becomes longer due to increased series resistance. The circuit illustrated in FIG. 4 helps to reduce the tendancy of the carry signal to become slower by regenerating the signal in the inverter 81.

Figure 5:
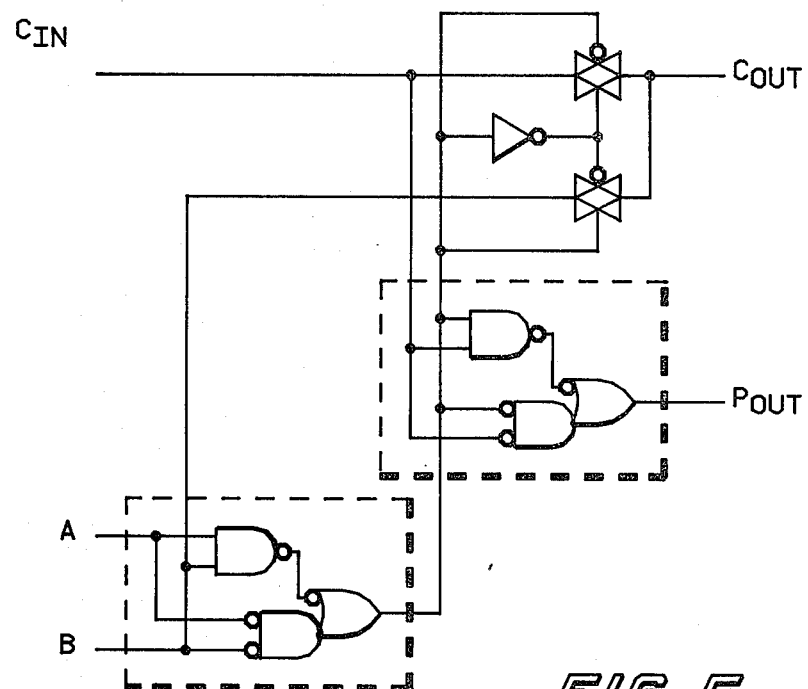
FIGS. 5–9 are detailed block diagrams of five different types of combining circuits, all of which are illustrated generally in FIG. 2.

A typical block diagram for the combining circuits 57, 59, and 61 in the final carry resolution row is illustrated in FIG. 5. The circuitry of FIG. 5 does not differ from that of FIG. 3 except that the AND gate 16 and the two inputs thereto are eliminated. If N and M represent relative small numbers, e.g. 5 or less, the combining circuit of FIG. 5 will be utilized for all of the combining circuits in the final carry resolution row, except the last or nth combining circuit. If more than approximately five combining circuits (n equals 5 or more) are utilized in the final carry resolution row, then a modification of the final combining circuits may be made to reduce the effect of the increased series resistance on the carry propagation path.

Figure 2:
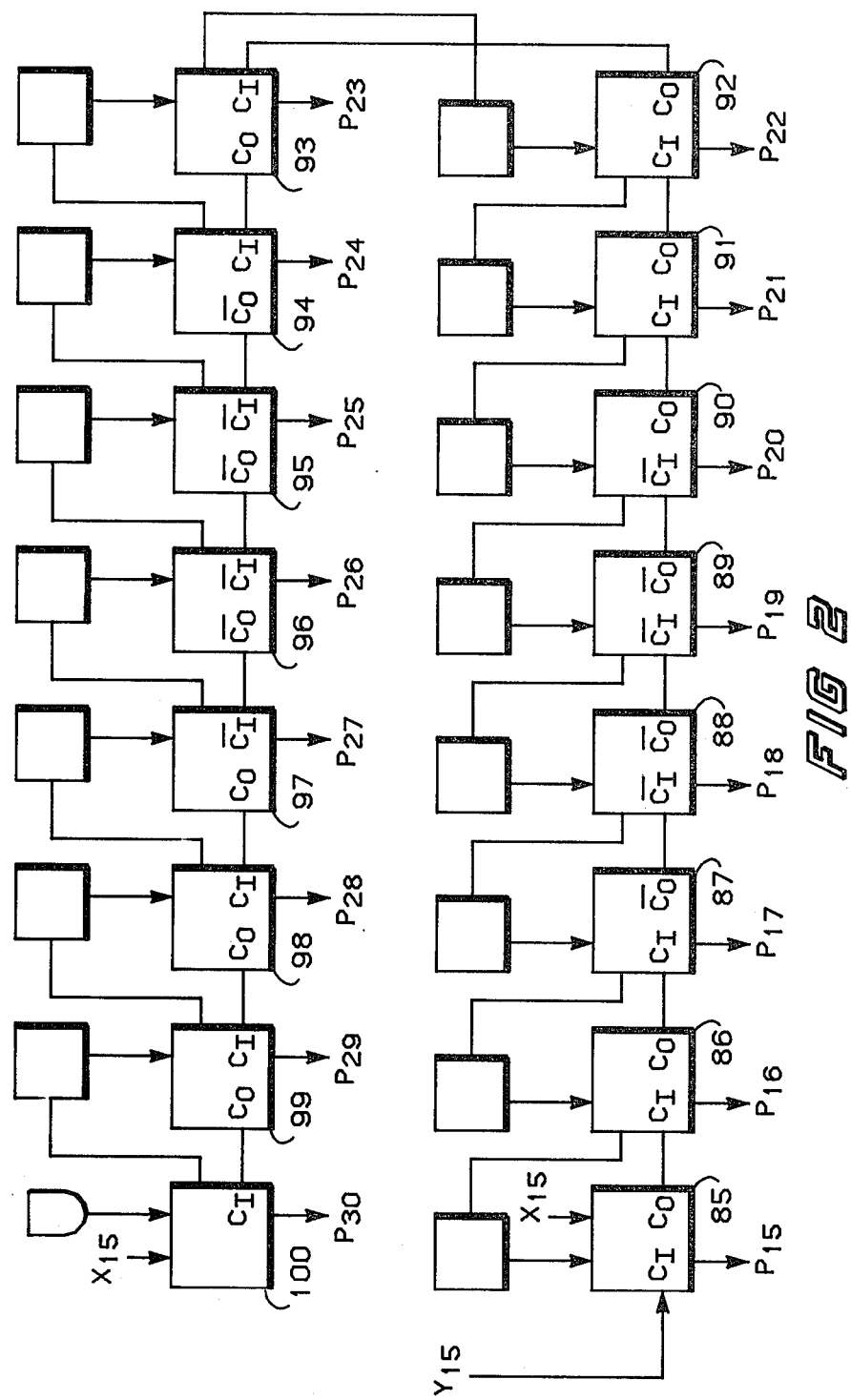
FIG. 2 is a block diagram of a portion of a sixteen-by-sixteen bit multiplying circuit similar to the circuit illustrated in FIG. 1.

Referring specifically to FIG. 2, the nth row and the final carry resolution row of a sixteen-by-sixteen bit digital, repeated addition type multiplying circuit is illustrated. In this embodiment sixteen combining circuits 85 through 100 are included in the final carry resolution row and because of the length of the carry path the carry signal could become extremely slow. However, in this embodiment only the combining circuits 85, 86, 91, 92, 93, 98 and 99 are constructed as illustrated in FIG. 4. It should be noted that the combining circuits 87 and 94 regenerate the carry signal by including an inverter therein. It should be noted that it is not necessary to double invert the carry path in order to regenerate the carry signal and the combining circuits 88 and 89, following the combining circuit 87, and the combining circuits 95 and 96, following the combining circuit 94, utilize an inverted carry signal. After three or four carry path gates the inverted signal is again regenerated in an inverter, as in combining circuit 90 and 97, and the circuits following again utilize a non-inverted carry signal. Since the propagation delay of an inverter regenerator contributes substantially to the total, or average, carry path delay, the use of the inverted carry signal in subsequent combining circuits, rather than a double inverter regenerator, substantially improves the speed of the carry propagation line. Through extensive experimentation it has been determined that the fastest carry propagation line includes an inverter regenerator between every three or four pass gates. It will of course be understood by those skilled in the art that regeneration could be accomplished between as few as two pass gates and as many as five pass gates with only a small reduction in speed. While a double inverter regenerator is slower than the periodic single inversion described above, if the double inversion is limited to every 3rd or 4th adder circuit in a row it will be faster than prior art circuits which used a double inverter in every adder circuit.

Figure 6:
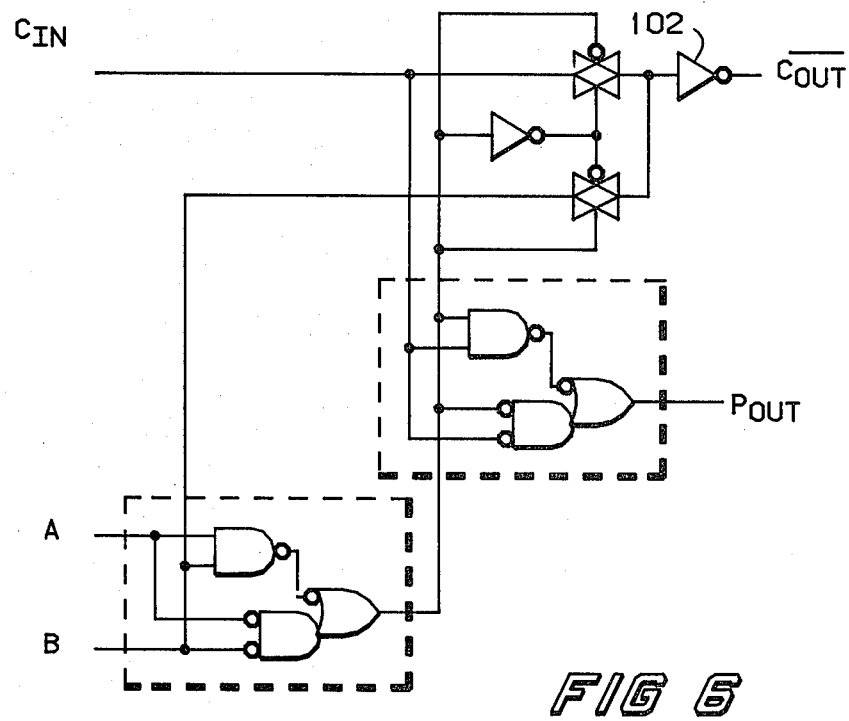

A typical detailed block diagram for the combining circuits 87 and 94 is illustrated in FIG. 6, wherein the circuitry is the same as the combining circuits illustrated in FIG. 5 except that an inverter 102 is included between the transmission gates and the output terminal. The inverter 102 is the inverter regenerator for the carry signal.

Figure 7:
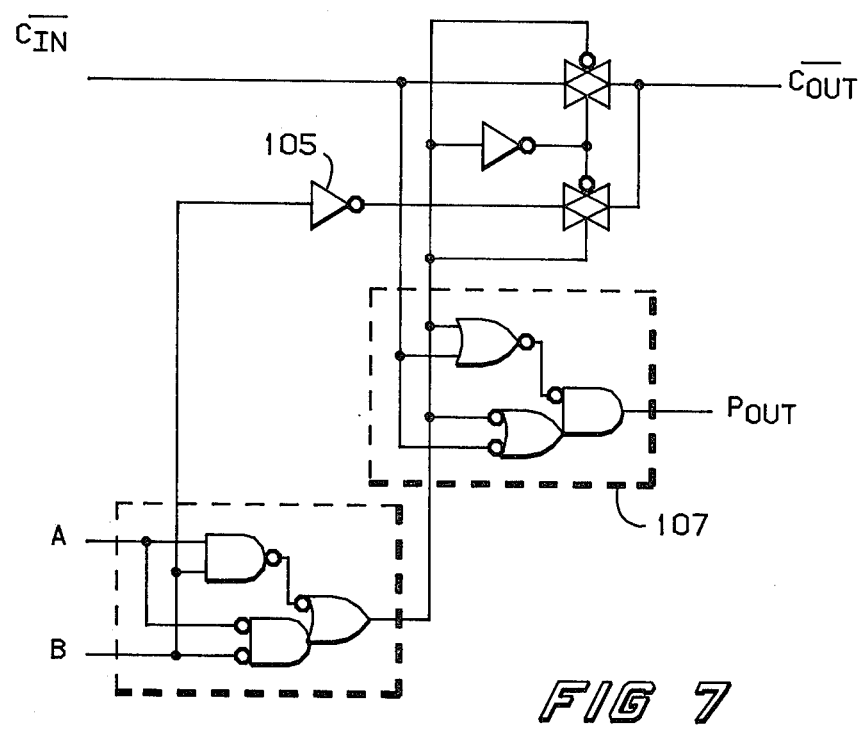

A typical detailed block diagram for combining circuits 88, 89, 95, and 96 is illustrated in FIG. 7. The circuitry illustrated in FIG. 7 operates in a fashion substantially similar to the structure of FIG. 6, except that an inverted carry signal is received and an inverted carry signal is supplied to the output terminal $\overline{C_{OUT}}$. Because the carry signals are inverted, the signal from the B input terminal is inverted by an inverter 105 and the gate for adding the output of the first exclusive NOR gate to the carry input is an exclusive NOR gate 107. This change in circuitry allows the combining circuit to operate properly on an inverted carry signal input and to provide an inverted carry signal output.

Figure 8:
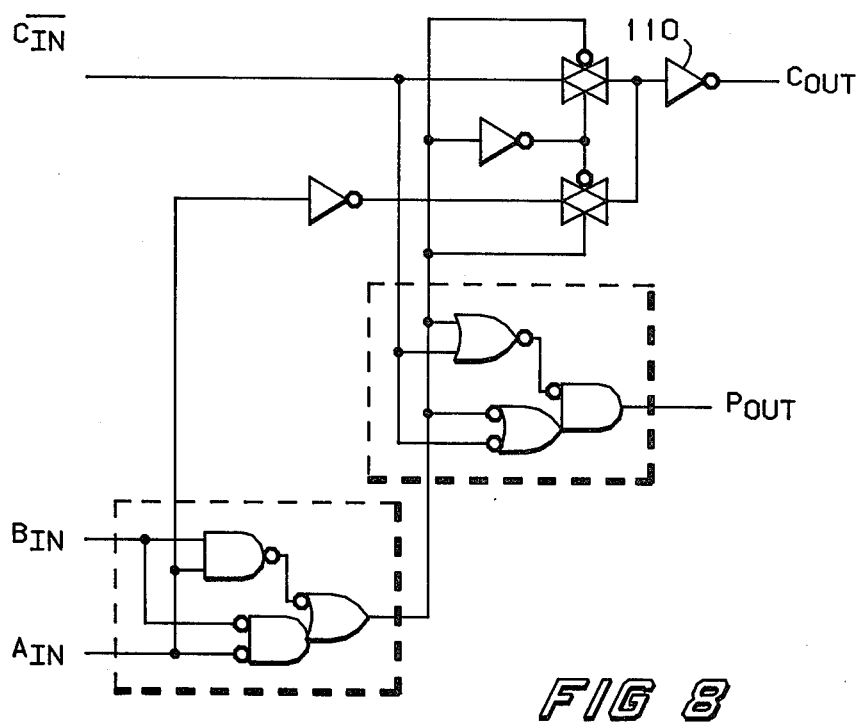

A typical detailed block diagram for the combining circuits 90 and 97 is illustrated in FIG. 8. The circuitry of FIG. 8 is substantially similar to the circuitry of FIG. 7 except that an inverter 110 is included in the carry propagation line between the transmission gates and the output terminal. Thus, an inverted carry signal is applied to the circuit illustrated in FIG. 8 and a normal carry signal is available at the output thereof.

Figure 9:
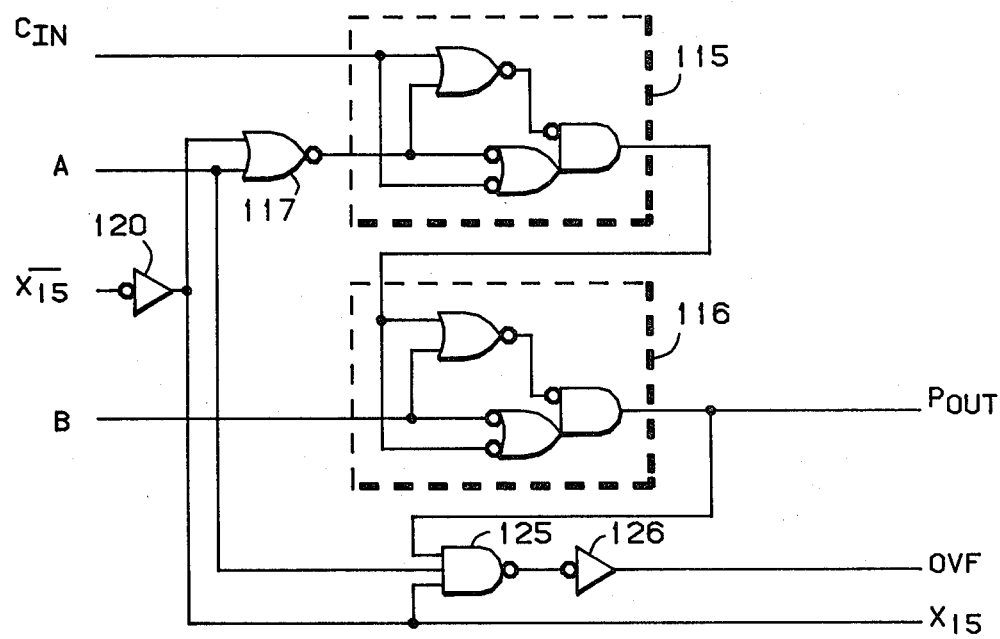

The final, or nth, combining circuit in the final carry resolution row, combining circuit 63 in FIG. 1 and 100 in FIG. 5, is constructed generally in accordance with the detailed block diagram of FIG. 9. Since the final combining circuit actually receives four inputs which must be added, a circuit containing at least three exclusive OR gates would normally be required. However, through the use of Boolean simplification the circuitry has been simplified to that shown in FIG. 9. A $C_{IN}$ terminal is connected to one input of an exclusive NOR gate 115, the output of which is connected to one input of a second exclusive NOR gate 116. An input terminal A and an input terminal $X_{15}$ are connected to two inputs of an OR gate 117, the output of which is inverted and supplied to a second input of the exclusive NOR gate 115. A second input $X_{15}$ is made available and connected through an inverter 120 to the same inputs as the terminal $X_{15}$, in case an inverted input is desired. A fourth input terminal B is connected to a second input of the exclusive NOR gate 116. The output of the exclusive NOR gate 116 is connected to the final output terminal of the multiplying circuit, $P_6$ in FIG. 1 and $P_{30}$ in FIG. 5. The output of the exclusive NOR gate 116 is also connected to one input of an AND gate 125. A second input of the AND gate 125 is connected to the input terminal A and a third input is connected to the input terminal $X_{15}$. The output of the AND gate 125 is inverted and applied through an inverting amplifier 126 to an overflow detect output terminal.

Thus, a high speed NxM bit digital, repeated addition type multiplying circuit is disclosed which incorporates the Burks-Goldstine-VonNeumann corrections automatically to provide a relatively simple circuit. A sixteen-by-sixteen bit multiplying circuit can be incorporated on a single semiconductor chip and additional structure for reducing the input lines and the output lines to sixteen without substantially increasing the required time, is disclosed in FIG. 10. It will of course be understood that the sixteen-by-sixteen bit multiplying circuit is utilized as an example and that larger or smaller N and M numbers might be utilized if desired. In each of the above described combining circuits the specific structure disclosed represents a logic function which can be implemented in at least 4 equivalent ways. It will be understood by those skilled in the art that the logic functions described herein are intended to include all of these equivalent structures and not just the structure specified.

Referring specifically to FIG. 10, multiplexed-pipelined input and output buses are disclosed for a specific embodiment of a sixteen-by-sixteen bit multiplying circuit and it will be understood by those skilled in the art that many modifications, such as interchanging the components for the multiplier and multiplicand can be provided without substantially effecting the invention. In this embodiment sixteen input pads $IN_0$ through $IN_{15}$ are provided on the semiconductor chip carrying the multiplying circuit. The sixteen input pads are connected to sixteen input latches labelled $X_0$ through $X_{15}$, for receiving the multiplicand bits. Each of the latches $X_0$ through $X_{15}$ has a slave latch $S_0$ through $S_{15}$ associated therewith. Each of the slave latches $S_0$ through $S_{15}$ has an output for supplying the sixteen multiplicand bits to the multiplying circuit. The input pads are also connected to sixteen latches designated $Y_0$ through $Y_{15}$ each having an output connected to the multiplying circuit for supplying the multiplier bits thereto. An input pad 130 is connected to receive an X or Y selection signal and a second input pad 131 is connected to receive clock pulses thereon. The pad 130 is connected through two inverters to an input of an AND gate 133 and through a single inverter to an input of a second AND gate 135. The pad 131 is connected through two inverters to a second input of the AND gate 133 and through a pair of inverters to a second input of the second AND gate 135. The outputs of the AND gates 133 and 135 are supplied to latch activating circuits 137 and 139, respectively. The latch activating circuit 137 is connected to the latches $X_0$ through $X_{15}$ and the latch activating circuit 139 is connected to the slave latches $S_0$ through $S_{15}$ and the latches $Y_0$ through $Y_{15}$.

When a "1" is applied to the pad 130 and a clock pulse appears on the pad 131, the latch activating circuit 137 receives a "1" which activates the latches $X_0$ through $X_{15}$ and any information on the pads $IN_0$ through $IN_{15}$ is latched into the latches $X_0$ through $X_{15}$. When a "0" is supplied to the pad 130 and a clock pulse appears on the pad 131, the latch activating circuit 139 receives a "1" and the latches $S_0$ then $S_{15}$ and $Y_0$ through $Y_{15}$ are activated so that all of the information in the latches $X_0$ through $X_{15}$ is moved into the slave latches $S_0$ through $S_{15}$ and any information then on the pads $IN_0$ through $IN_{15}$ is latched into the latches $Y_0$ through $Y_{15}$. Thus, both the multiplier and the multiplicand, which contain a total of 32 bits, can be supplied simultaneously to the multiplying portion of the chip utilizing only sixteen input lines.

Similarly, the $N+M-1$ outputs are supplied to two sets of latches $P_0$ through $P_{14}$ and $P_{15}$ through $P_{30}$. A multiplexing unit 145 having sixteen latches therein has outputs connected through sixteen gates 147 through 162 to sixteen output pads $OUT_0$ through $OUT_{15}$. The gates 147 through 162 are enabled by a signal on a pad 165, which is connected to the gates 147 through 162 through a series of inverters. The inverters utilized herein, in conjunction with all of the connection pads, are designed to provide proper timing and signal polarity as will be understood by those skilled in the art. A pad 170, adapted to receive a clock signal thereon is connected through a plurality of inverters to the clock inputs of the latches $P_0$ through $P_{30}$. The latches $P_0$ through $P_{30}$ are connected to the multiplexing circuit 145, which is controlled by means of a signal applied to a pad 171. When a "1" is applied to the pad 171 the bits stored in latches $P_0$ through $P_{14}$ are applied to the multiplexing circuit 145 and, these bits are then supplied to the output pads $OUT_0$ through $OUT_{15}$ in response to a signal applied to the output enable pad 165. When a "0" is applied to the pad 171 the bits contained in the latches $P_{15}$ through $P_{30}$ are supplied to the multiplexing circuit 145. Thus, an answer containing $N+M-1$ bits can be carried by means of N lines where N is at least as large as M. By providing the multiplexed-pipelined input and output circuitry described, the number of input and output lines can be substantially reduced and the time for supplying data to the multiplexing circuit and receiving data therefrom is not increased substantially since much of this switching can occur during the time that the multiplying operation is being performed.

Thus, an improved high speed $N \times M$ bit digital, repeated addition type multiplying circuit has been disclosed which is substantially faster and simpler than prior art structures and which can be incorporated on a single semiconductor chip. This fast multiplier is especially designed to be used in digital signal processing applications which require large numbers of multiply accumulates per second. Examples include dedicated FET boxes for radar processing, speech processing transforms, low power digital filters, etc. With 5 micron CMOS circuitry the multiply operation should be completed in approximately 500 nanoseconds and the circuitry will require only approximately 29 milliwatts at 5 volts. This is a substantial saving in power over prior art multipliers.

While I have shown and described specific embodiments of this invention, further modifications and improvements will occur to those skilled in the art. I desire it to be understood, therefore, that this invention is not limited to the particular forms shown and I intend in the appended claims to cover all modifications which do not depart from the spirit and scope of this invention.

It is claimed:

1. A high speed $N \times M$ bit digital, repeated addition type multiplying circuit for multiplying a N-bit multiplicand by a M-bit multiplier, said digital multiplier comprising:
   (a) a plurality of rows and columns of combining circuits each including an AND gate having a multiplier-bit input, a multiplicand-bit input, and an output and a multiply/adder cell having a sum-bit input and a carry-bit input, and a sum-bit output and a carry-bit output, said multiply/adder cell including two combing gates, each being one of an exclusive OR circuit and an exclusive NOR circuit, and each having two inputs and an output with the inputs of a first of said two combining gates being connected one each to the sum-bit input and to the output of the AND gate and the inputs of the second of said two combining gates being connected one each to the output of the first of said two combining gates and to the carry-bit input, and said multiply/adder cell further including a high speed carry propagation line connected between the carry-bit input and the carry-bit output;
   (b) the multiplier-bit inputs and the multiplicand-bit inputs of each of said combining circuits being connected to receive a different combination of bits of the M-bit multiplier and the N-bit multiplicand and the sum-bit inputs of each of said combining circuits being connected to the sum-bit outputs of other of said combining circuits; and
   (c) the carry-bit output of each of a plurality of said combining circuits being coupled with the carry-bit inputs of the corresponding combining circuits in the next highest row for providing repeated addition type multiplication of the multiplier and the multiplicand.

2. A high speed $N \times M$ bit digital, repeated addition type multiplying circuit as claimed in claim 1, and further including an additional row of multiply/adder cells for carry resolution.

3. A high speed $N \times M$ bit digital, repeated addition type multiplying circuit for multiplying a N-bit multiplicand, the $N^{th}$ bit of which is a sign bit, by a M-bit multiplier, the $M^{th}$ bit of which is a sign bit, said digital multiplier comprising:
   (a) $N(M+1)$ combining circuits mathematically arranged into M addition rows and a final carry resolution row forming $N+M-1$ columns, each combining circuit in the M addition rows including an AND gate having two inputs and and an output, with one input of each AND gate in a row being connected in parallel and to receive a multiplier-bit, each row receiving a different multiplier-bit, and with the other input of each AND gate being connected to receive a multiplicand-bit, each AND gate in a row receiving a different multiplicand bit;
   (b) each combining circuit, except the final, $N^{th}$, sign bit combining circuit and the first row, in each of the M addition rows further including a multiply/adder cell having an input connected to the output of said associated AND gate, a sum input and output with the sum input being connected to the sum output of the combining circuit in the previous row and like column, and a carry input and output with the carry input being connected to the carry output of the combining circuit in the previous row and previous column, except for the carry inputs of the combining circuits in the second row which are connected to a common potential;

(c) each combining circuit in the $M^{th}$ addition row including inverting means connected to invert the multiplicand bits prior to application to the AND gate and each of the $N^{th}$ bit combining circuits in the remaining addition rows including inverting means connected to invert the multiplier bits prior to application to the AND gates;

(d) the combining circuits in the final carry resolution row each including a multiply/adder cell having a sum input connected to the sum output of the corresponding combining circuit in the $M^{th}$ addition row and a sum output forming a portion of the output of the digital multiplier, the first and $N^{th}$ combining circuits in the final carry resolution row each having an input connected to receive the $N^{th}$ multiplicand bit, the first combining circuit in the final carry resolution row further having an input connected to receive the $M^{th}$ multiplier bit, and the $N-1$ remaining combining circuits, excluding the first combining circuit in the final carry resolution row, each having two inputs connected to receive the carry-bit outputs from the preceeding combining circuits in the $M^{th}$ addition row and the final carry resolution row, respectively.

4. A high speed N×M bit digital, repeated addition type multiplying circuit as claimed in claim 3 wherein N and M are both equal to 16 and the N(M+1) combining circuits are formed on a single semiconductor chip.

5. A high speed N×M bit digital, repeated addition type multiplying circuit on a single chip, wherein N is a number of bits representing one of the multiplier and multiplicand, M is a number of bits representing the other of the multiplier and multiplicand, and N is at least as large as M, said digital multiplying circuit comprising:

(a) semiconductor chip;

(b) N(M+1) combining circuits formed on said chip and mathematically arranged into M addition rows and a final carry resolution row forming N+M-1 columns and outputs;

(c) N input terminals for the one of the multiplier and multiplicand and M input terminals for the other of the multiplier and the multiplicand, said N and M input terminals being connected to said N(M+1) combining circuits for providing repeated addition type multiplication of the multiplier and the multiplicand represented by the N and M bits;

(d) N input pads formed on said semiconductor chip;

(e) M clocked latch circuits formed on said semiconductor chip and having M clocked slave latch circuits formed on said semiconductor chip and associated therewith, said M clocked latch circuits being coupled to at least M of the N input pads and said M clocked slave latch circuits being coupled to said M input terminals of said combining circuits, said M clocked latch circuits receiving and latching bits from said input pads in response to clock signals applied thereto and latching the bits into said M clocked slave latch circuits in response to clock signals applied thereto;

(f) N clocked latch circuits formed on said semiconductor chip and coupled to the N input terminals of said combining circuits and to the N input pads for receiving and latching bits from the N input pads in response to clock signals applied to said clocked latch circuits; and (g) said N clocked latch circuits and said M clocked slave latch circuits connecting the latched bits to the N and M input terminals, respectively, of the combining circuits in response to clock signals applied thereto.

6. A high speed N×M bit digital, repeated addition type multiplying circuit as claimed in claim 5 wherein N and M are both equal to 16.

7. A high sped N×M bit digital, repeated addition type multiplying circuit as claimed in claim 5 including in addition:

N output pads formed on the semiconductor chip;

first and second groups of clocked latch circuits, including a total of N×M−1 latch circuits, formed on the semiconductor chip and coupled to the N×M−1 outputs of the combining circuits for receiving and latching bits therein; and multiplexing circuitry formed on the semiconductor chip and coupled to said N output pads and said first and second groups of clocked latch circuits, said multiplexing circuitry responding to clock signals applied thereto to couple bits from said first and second groups of clocked latch circuits to said N output pads in a predetermined sequence.

8. In a high speed addition type arithmetic logic unit, a high speed carry propagation line comprising:

(a) a plurality of digital adder circuits forming an addition row, each adder circuit including a carry-bit input and a carry-bit output;

(b) said digital adder circuits each being constructed with a high speed carry propagation line between the carry-bit input and the carry-bit output including, as active elements, only pass gates;

(c) regeneration means coupling the carry-bit outputs of predetermined ones of said plurality of digital adder circuits to the carry-bit inputs of the next adjacent ones of the plurality of digital adder circuits in the addition row, the predetermined ones of said plurality of digital adder circuits having predetermined numbers greater than one, of the plurality of digital adder circuits interspersed therebetween in the addition row with the carry-bit outputs of each interspersed digital adder circuit, except the last digital adder circuit in the addition row, being connected to the carry bit inputs of the following digital adder circuit in the addition row, and said regeneration means inverting the carry bits; and (d) alternate predetermined numbers of digital adder circuits between said predetermined ones of said plurality of digital adder circuits including means for utilizing inverted carry bits.

9. The invention as claimed in claim 8 wherein the arithmetic logic unit is a high speed N×M bit digital, repeated addition type multiplying circuit and the addition row formed by the plurality of digital adder circuits is a final carry resolution row including N digital adder circuits.

10. The invention as claimed in claim 8 wherein the regeneration means includes a plurality of inverting amplifiers, with one amplifier being connected between each of the predetermined numbers of digital adder circuits.

11. The invention as claimed in claim 8 wherein the predetermined numbers of digital adder circuits lies in the range of approximately 2-5.

12. The invention as claimed in claim 11 wherein the predetermined numbers of digital adder circuits is one of the numbers 3 and 4.

13. In a high speed addition type arithmetic logic unit, a high speed carry propagation line comprising:
   (a) a plurality of digital adder circuits forming an addition row, each adder circuit including a carry-bit input and a carry-bit output;
   (b) said digital adder circuits each being constructed with a high speed carry propagation line including, as active elements, only pass gates; and
   (c) regeneration means coupling the carry propagation lines of predetermined ones of said digital adder circuits in the addition row, the predetermined ones of said plurality of digital adder circuits having predetermined numbers, greater than one, of said plurality of digital adder circuits interspersed therebetween in the addition row with the carry propagation lines of the interspersed digital adder circuits coupled together and to the carry propagation lines of the predetermined ones of said digital adder circuits to form a high speed carry propagation line, and said regeneration means inverting the carry bits twice between the interspersed predetermined numbers of said plurality of digital adder circuits.

* * * * *